Feb. 3, 1931. F. H. OWENS 1,791,039
SOUND REPRODUCING APPARATUS
Filed April 16, 1929
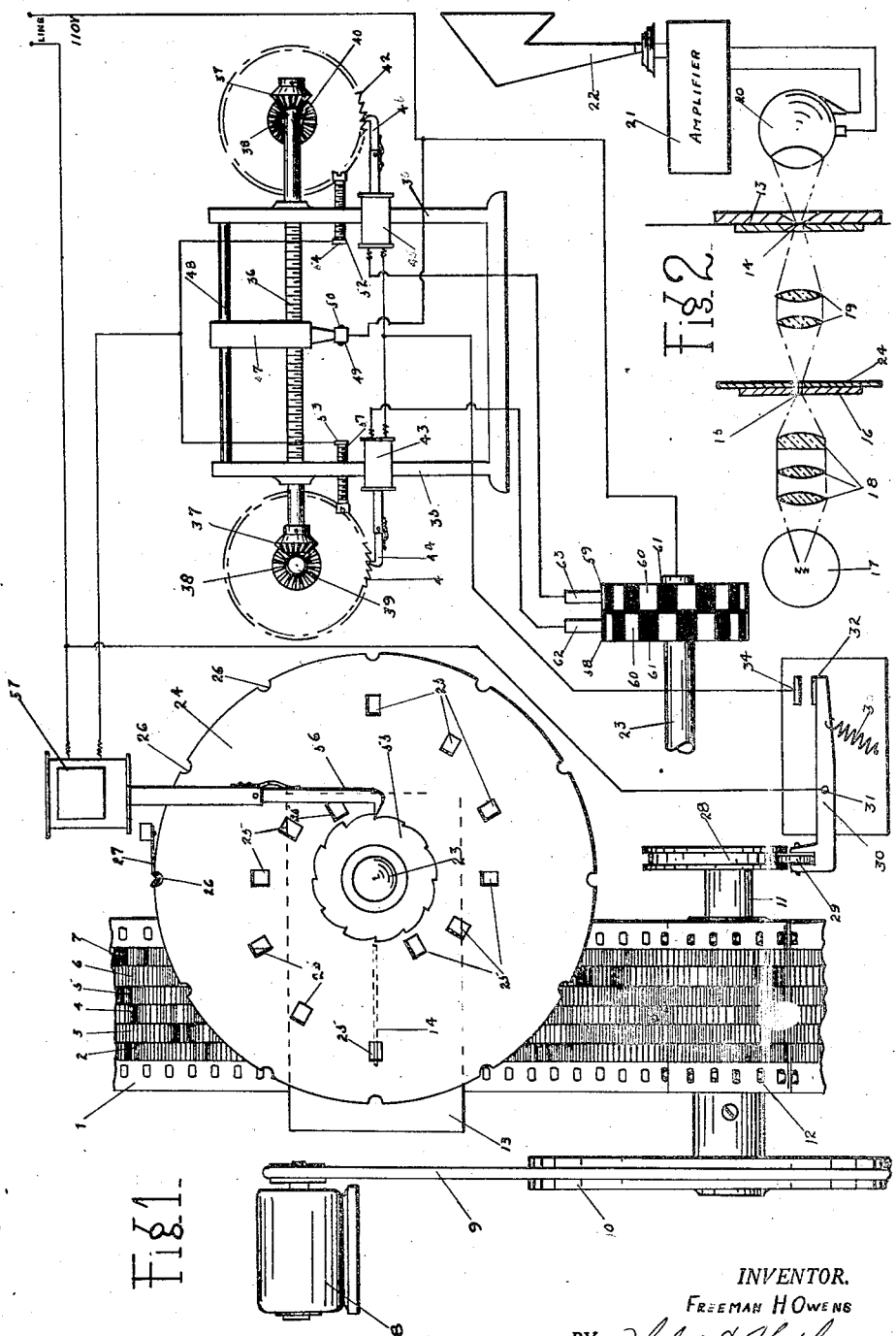
INVENTOR.
Freeman H Owens
BY
ATTORNEY Patented Feb. 3, 1931

1,791,039

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

SOUND-REPRODUCING APPARATUS

Application filed April 16, 1929. Serial No. 355,513.

My invention relates to a sound reproducing apparatus and particularly to that type adapted for reproducing photographic sound records and has for its primary object the provision of means for reproducing a plurality of sound records on a single strip of film one after the other, automatically.

Another object lies in the provision of certain circuit controlling means whereby the automatic operation of a selector device is controlled to successively permit the reproduction of such plurality of sound records.

In the art of reproducing photographic sound records, it may be desirable to provide a plurality of such records on a single strip of film and reproduce the same one after another automatically, said sound records being either independent of each other insofar as subject is concerned, or one following the other to provide a continuous selection or program. I have by my invention provided means whereby the successive reproduction of such records is permitted and automatically controlled.

Other objects and advantages in details of construction and operation will be apparent as the description proceeds, reference now being had to the figures of the accompanying drawing forming a part of this application and wherein like reference numerals indicate like parts.

In the drawing:—

Figure 1 is a detail diagrammatic illustration of my invention.

Figure 2 is a detail diagrammatic view showing the sound reproducing mechanism used in connection with my invention.

The reference character 1 refers to a strip of motion picture film provided with a plurality of photographic sound records recorded or printed thereon and indicated at 2, 3, 4, 5, 6 and 7. Although I have shown 6 such records on the drawing, it will be understood that my invention is not limited to that particular number, as there may be more or less records or sound tracks as desired.

A motor 8 provides a source of power which through the belt 9 and pulley fly wheel 10 mounted upon the shaft 11 serves as a means for continuously moving the film strip 1 at a constant speed, by means of the sprocket 12 also mounted upon the shaft 11. The film strip 1 is moved by the sprocket 12 through a film gate 13 provided with a slit opening 14 of a length substantially equal to the width of the sound records on the film. A very narrow slit 15 is provided for instance in a plate 16 spaced from the film gate 13 and rays of light from a lamp 17 passing through condenser lenses 18 serve to illuminate said slit 15, the illuminated areal image of which is focused by means of the lenses 19 upon the film 1 where it passes the slit opening 14 in the film gate. A photo-electric cell 20 is provided to receive the modulated light rays passing through the gate 13 and such cell is suitably connected to an amplifier 21 and loud speaker device 22. The slit 15 in the plate 16 is also of a length equal to the width of all the sound records on the film 1.

Suitably mounted upon a shaft 23 closely adjacent the slit plate 16, is a selector disk 24 interposed between the slit 15 and the film gate 13. The selector disk 24 is provided with openings 25 so arranged around the disk that they may be upon rotation of the disk successively brought into registry with the slit 15 and at such point in alignment with a particular sound record on the film 1. I have shown 12 of such openings 25 so arranged that rotation of the disk 24 step by step will successively bring one of the openings 25 into alignment with adjacent sound records whereby to successively permit the reproduction of such sound records by the reproducing mechanism just described.

In Figure 1, one of the openings 25 is in registry with the slit 15 and the slit 14 and in alignment with the sound record 2. When such record has been completely reproduced the disk 24 will be rotated one step in a manner to be described, thus moving this first opening 25 out of registry with the slits and bringing the next opening 25 into registry therewith and in alignment with sound record 3. As will be obvious from the drawing, this operation can be repeated indefinitely each movement of the disk bringing the next opening 25 into registry with the slits and in alignment with the next sound record to be reproduced. The selector disk 24 is provided around its periphery with notches 26 equally spaced and equal in number to the number of openings 25. A spring catch 27 is provided at one point adjacent the periphery of the disk and adapted to cooperate with said notches whereby the disk may be frictionally held in each position of registration of the openings 25 and the slits.

It may be stated here that the film 1 with the sound records thereon may be an endless band moving continuously in one direction with respect to the slits, or it may be a single length of film movable first in one direction for the length of one sound record and then upon the operation of some suitable reversing mechanism, in the opposite direction for the length of the next sound record, again reversing and so on at the end of each sound record. Regardless of whether the film is of the endless type or the single length type, the selector disk is operative to rotate one step upon the completion of each sound record whereby the next sound record may be reproduced through the registered opening 25.

As before stated, means are provided for automatically shifting the selector disk 24 step by step upon the completion of the reproduction of each sound record whereby to register the next opening 25 with the next sound record. Such means will now be described.

Mounted upon the end of the shaft 11 is a cam 28 engageable with which is a roller or rider 29 carried upon one end of a lever 30 pivoted as at 31 and carrying at its opposite end a contact device 32. A coil spring 33 may be provided to maintain engagement at all times between the roller 29 and the cam 28. Located adjacent the movable contact 32 is a stationary contact 34 adapted to be engaged by the contact 32 upon each rocking motion of the lever 30 produced by the engagement of the roller 29 with the cam 28. Obviously, therefore, upon each rotation of the shaft 11 and the sprocket 12 in moving the film 1, the contacts 32 and 34 will be closed momentarily. The purpose of this arrangement will be made clear as the description proceeds.

Suitably supported by means of the upright standards 35 and having bearing therein is a screw threaded shaft 36 provided at its ends with miter gears 37 meshing with similar miter gears 38 mounted upon shafts 39 and 40 respectively. Fixed upon the shaft 39 is a toothed disk 41 and fixed upon the shaft 40 is a similar toothed disk 42. It may be stated here that the disks 41 and 42 may if desired be mounted directly upon the ends of the screw threaded shaft 36, but for clearness of illustration I have shown them turned parallel with said shaft and connected by the miter gearing 37 and 38.

Suitably mounted in operative relation to the toothed disk 41 is an electromagnet 43, the armature of which is provided with a pawl 44 adapted to engage with the teeth of the disk 41 and upon inward movement of the armature to rotate said disk. There is also provided an electromagnet 45 in operative relation to the toothed disk 42, and the armature of this magnet is provided with a pawl 46 engaging with the teeth of the disk 42 and adapted upon the inward movement of the armature to move the disk 42. The amount of movement of either the disk 41 or the disk 42 by its respective magnet, upon each operation thereof may be one or more teeth depending upon the circumstances of operation as will be hereafter more clearly set forth. We will assume that such movement will be a distance of one tooth upon each operation.

Obviously, successive operation of the magnet 43 will serve to rotate the disk 41 step by step and consequently to rotate the threaded shaft 36 step by step in one direction. Likewise operation of the magnet 45 will serve to rotate the threaded shaft 36 step by step in the opposite direction.

Mounted upon the screw threaded shaft 36 is a follower 47 adapted to travel along the shaft 36 in one direction or the other, depending upon the direction of rotation of such shaft. The follower 47 is guided in such movement by a rod 48 extending between the upright supports 35 and passing through the follower 47. The follower 47 carries at its lower end a pair of contacts 49 and 50 suitably insulated from each other. Adjustably mounted in the uprights 35 are contact screws 51 and 52 carrying the contacts 53 and 54 respectively, the same being positioned in the path of travel of the contacts 49 and 50 whereby when the follower 47 has travelled a predetermined distance upon the shaft 36 in one direction, the contact 49 will engage the contact 53 and when the follower has travelled a predetermined distance in the other direction, the contact 50 will close with contact 54. The distance which the follower 47 has to travel before making such contacts may be determined and adjusted by means of the contact screws 51 and 52, and such adjustment depends upon the length of the sound records on the film as will be more clearly pointed out.

The shaft 23 upon which the selector disk 24 is mounted is provided with a toothed disk 55 engageable with which is the pawl 56 forming a part of the armature of an electromagnet 57. When the magnet 57 is energized it serves to move the pawl 56 inwardly a sufficient distance to rotate the disk 24 one step, that is sufficient to bring the next opening 25 into registry with the slits 15 and 14 and in alignment with the next sound record on the film. As shown clearly in Figure 1, the contacts 53 and 54 at each end of the threaded shaft 36, and the contacts 49 and 50 carried by the follower 47 are suitably electrically connected with the magnet 57 whereby upon engagement either of the contact 49 with contact 53 or of contact 50 with contact 54, the magnet 57 will be energized whereby to move the disk 24 one step.

Also mounted upon the shaft 23 is a pair of contact drums or distributors indicated as 58 and 59, insulated from each other and having the peripheries thereof divided into alternate contact and insulated sections 60 and 61 respectively. A brush 62 is adapted to engage and ride upon the periphery of the drum 58 and a similar brush 63 engages and rides upon the periphery of the drum 59. As shown clearly in Figure 1, when the brush 62 engages an insulated portion 61 on the drum 58, the brush 63 will be engaged with a contact portion 60 of the drum 59. These distributor drums have their contact portions in the electric circuits of the electromagnets 43 and 45 respectively. When the brush 62 engages one of the contact sections 60 on the drum 58, the magnet 43 will be included in the effective circuit while the circuit to the magnet 45 will be broken by virtue of the brush 63 engaging an insulated section 61 on the drum 59. When the drums are rotated one step however, due to the rotation of the shaft 23 and the selector disk 24, the brush 62 will engage an insulated section 61 on the drum 58, thus breaking the circuit through the magnet 43 and the brush 63 will engage a contact section 60 on the drum 59, thus establishing the circuit through the magnet 45.

The operation of my invention will now be described:—

Assuming for instance that the length of the sound records on the film 1 is 200 feet—it can be calculated how many revolutions of the sprocket shaft 11 will be necessary to move the 200 feet of film past the reproducing station and consequently how many times the contacts 32 and 34 will thus be closed during such length of movement. The adjustable contacts 51 and 52 can therefore be adjusted with respect to the follower 47 whereby such follower will move on the screw shaft 36 from one of the contacts 53 or 54 to the other during such movement of the film. The rotation of the screw shaft 36 of course is controlled by the rotation of the toothed disks 41 and 42 which are operated by the magnets 43 and 45 depending upon which is in circuit with the contacts 32 and 34 as controlled by the distributor drums 58 and 59.

Assuming now that the contacts 51 and 52 have been adjusted for the proper length of film and the selector disk 24 is in position shown with the first opening 25 in registry with the slits 15 and 14, and in alignment with sound record 2. In such position, the brush 63 engages a contact section on the drum 59, thus establishing the circuit between the contacts 32 and 34 and the magnet 45, whereas the brush 62 engages an insulated section 61 on the drum 58, thus breaking the circuit to the magnet 43. Therefore, upon each rotation of the sprocket shaft 11 and the cam 28, the contacts 32 and 34 will engage, energizing the magnet 45 intermittently to rotate the toothed disk 42 step by step and consequently the screw shaft 36. By the time the predetermined length of film or sound record has been moved past the reproducing station, the follower 47 will have moved along the shaft 36 and brought the contacts 50 and 54 into engagement whereupon the magnet 57 will be energized and the selector disk 24 rotated one step to bring the next opening 25 into registry for reproduction of the next sound record 3.

This rotation of the selector disk 24, of course, rotates its shaft 23 and the distributor drums 58 and 59 one step. The brush 63 therefore, now engages with an insulated section 61 on the drum 59, breaking the circuit through the magnet 45, and the brush 62 will engage with a contact section 60 on the drum 58, thus establishing the circuit through the magnet 43. Therefore, continued movement of the film by virtue of continued rotation of the sprocket shaft 11 and the cam 28, will now result in the intermittent engagement of the contacts 32 and 34 intermittently energizing the magnet 43 which thus rotates the disk 41 step by step and consequently rotates the screw shaft 36 in the opposite direction. The follower 47 will thus travel away from the contact 54 and when the film has again travelled its predetermined distance, that is the length of the sound record, the follower 47 will have moved the contact 49 into engagement with the contact 53, again energizing the magnet 57 to again rotate the selector disk 24 one step to bring the next opening 25 into registry with the slits and in alignment with the next sound record 4.

Obviously, this operation may be continued and repeated indefinitely, the various operations taking effect automatically. When the last sound record 7 has been reproduced, the openings 25 on the disk 24 are so arranged that upon the next step rotation of such disk, an opening 25 will again register with the slits in alignment with the first sound record 2. Thus, the continuous reproduction of the sound records may be carried on indefinitely, so long as the film is moved.

Of course, many changes may be made in details of construction and arrangement of parts without departing from the spirit and scope of my invention. I do not limit myself, therefore, to the exact form herein shown and described other than by the appended claims.

I claim:

1. Sound reproducing apparatus comprising a light, a slit and means for moving a film bearing a plurality of sound records in relation to said slit, a movable member provided with openings adapted to register one at a time with said slit in alignment with one of said sound records, means for moving said member in predetermined timed relation to said film comprising an electric actuating device and a movable contact for operating said device, the movement of said contact being controlled by said film moving means.

2. Sound reproducing apparatus comprising a light, a slit and means for moving a film bearing a plurality of sound records in relation to said slit, movable member having a plurality of openings adapted to be brought into successive registry with said slit and in alignment with successive sound records, electric means for actuating said member, and means including an electric contact device operated by the film moving means for controlling the actuation of said member actuating means.

3. Sound reproducing apparatus comprising in combination, means for moving a film bearing a plurality of sound records past said slit, a movable member provided with openings adapted to register one at a time with said slit in alignment with one of said sound records, electric means for so moving said member, means for actuating said electric means including a traveling contact device, and means operated by the film moving means for moving said contact device step by step a predetermined distance for actuating said electric means.

4. Sound reproducing apparatus comprising in combination, means for moving a film bearing a plurality of sound records past said slit, a movable member provided with openings adapted to register one at a time with said slit in alignment with one of said sound records, electric means for so moving said member, a reversible traveling contact device operable at the limit of its travel in each direction to actuate said electric means, and means operated by said film moving means for driving said traveling contact device.

5. Sound reproducing apparatus comprising in combination, means for moving a film bearing a plurality of sound records past said slit, a movable member provided with openings adapted to register one at a time with said slit in alignment with one of said sound records, electric means for so moving said member, a reversible traveling contact device operable at the limit of its travel in each direction to actuate said electric means, and means operated by said film moving means for driving said traveling contact device, step by step.

6. Sound reproducing apparatus comprising in combination, means for moving a film bearing a plurality of sound records past said slit, a movable member provided with openings adapted to register one at a time with said slit in alignment with one of said sound records, electric means for so moving said member, a reversible traveling contact device operable at the limit of its travel in each direction to actuate said electric means, and means operated by said film moving means for driving said traveling contact device, step by step, and means controlled by the movement of said shifter device for reversing the direction of travel of said traveling contact device.

7. Sound reproducing apparatus comprising in combination, means for moving a film bearing a plurality of sound records past said slit, a movable member provided with openings adapted to register one at a time with said slit in alignment with one of said sound records, electric means for so moving said member, a reversible traveling contact device operable at the limit of its travel in each direction to actuate said electric means, and means operated by said film moving means for driving said traveling contact device, and means for adjusting the limits of travel of said traveling contact device.

8. In combination, film moving means, a member adapted for successive movement in relation to the film, electric means for so moving said member, a reversible traveling contact device operable at the limit of its travel in each direction to actuate said electric means, a pair of electric devices, one for driving said traveling contact in each direction, means operated by said film moving means for selectively operating said electric devices, and means operative upon movement of said member for alternately rendering operative said electric devices.

9. In combination, film moving means, a movable member adapted for successive movement in relation to the film, electric means for so moving said member, a reversible traveling contact device operable at the limit of its travel in each direction to actuate said electric means, a pair of electric devices, one for driving said traveling contact in each direction, means operated by said film moving means for selectively operating said electric devices, and means operative upon movement of said shifter for alternately rendering operative said electric devices; said last named means including movable staggered contacts in circuit with said electric devices, and movable upon rotation of said member to make contact to one device and break contact to the other device.

In testimony whereof, I affix my signature.

FREEMAN H. OWENS.